(12) United States Patent
Fischl

(10) Patent No.: US 10,837,508 B2
(45) Date of Patent: Nov. 17, 2020

(54) BRAKE CARRIER

(71) Applicant: KNORR-BREMSE Systeme fuer Nutzfahrzeuge GmbH, Munich (DE)

(72) Inventor: Tobias Fischl, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 35 days.

(21) Appl. No.: 16/271,201

(22) Filed: Feb. 8, 2019

(65) Prior Publication Data
US 2019/0170202 A1 Jun. 6, 2019

Related U.S. Application Data

(63) Continuation of application No. PCT/EP2017/069471, filed on Aug. 1, 2017.

(30) Foreign Application Priority Data

Aug. 10, 2016 (DE) .......... 10 2016 114 826

(51) Int. Cl.
*F16D 65/00* (2006.01)
*F16D 55/225* (2006.01)
(Continued)

(52) U.S. Cl.
CPC .......... *F16D 65/0056* (2013.01); *B22C 9/22* (2013.01); *F16D 55/225* (2013.01);
(Continued)

(58) Field of Classification Search
CPC ..... F16D 2200/0013; F16D 2200/0082; F16D 2200/0086; F16D 2250/0007;
(Continued)

(56) References Cited

U.S. PATENT DOCUMENTS 3,212,156 A * 10/1965 Derror ............... B28B 1/261
249/105
4,055,214 A * 10/1977 Nieman ............... B22C 7/00
164/241
(Continued)

FOREIGN PATENT DOCUMENTS

CN 104105900 A 10/2014
CN 104813059 A 7/2015
(Continued)

OTHER PUBLICATIONS

Chinese-language Office Action issued in counterpart Chinese Application No. 201780055512.X dated Nov. 12, 2019 with partial English translation (seven pages).
(Continued)

*Primary Examiner* — Thomas J Williams
(74) *Attorney, Agent, or Firm* — Crowell & Moring LLP

(57) ABSTRACT

A brake carrier is provided for a disc brake having at least one brake pad, wherein the brake carrier includes: a wrap-around disc holder that wraps around a section of a brake disc of the disc brake in a frame-like manner; at least one brake pad slot in which the brake carrier guides the at least one brake pad, wherein the at least one pad slot is formed by carrier lugs, support surfaces and bridge struts on the wrap-around disc holder. The brake carrier is produced as a single piece using a shaping method and has a mold partition burr. The mold partition burr is arranged outside of the wrap-around disc holder.

14 Claims, 6 Drawing Sheets

(51) Int. Cl.
  B22C 9/22 (2006.01)
  F16D 55/226 (2006.01)
  F16D 65/092 (2006.01)
  F16D 55/00 (2006.01)
  F16D 51/00 (2006.01)
  F16D 65/02 (2006.01)

(52) U.S. Cl.
  CPC ....... F16D 55/2262 (2013.01); F16D 65/092 (2013.01); F16D 2051/003 (2013.01); F16D 2055/0008 (2013.01); F16D 2065/026 (2013.01); F16D 2200/0013 (2013.01); F16D 2250/003 (2013.01); F16D 2250/0007 (2013.01); F16D 2250/0015 (2013.01)

(58) Field of Classification Search
  CPC ....... F16D 2250/0015; F16D 2250/003; F16D 65/0056; F16D 65/092; F16D 55/225; F16D 55/2262; B22C 9/10; B22C 9/101; B22C 9/18; B22C 9/22
  See application file for complete search history.

(56) References Cited

U.S. PATENT DOCUMENTS

| | | | |
|---|---|---|---|
| 8,161,614 | B2 | 4/2012 | Plantan et al. |
| 10,138,962 | B2 | 11/2018 | Rguichi et al. |
| 10,260,579 | B2 | 4/2019 | Magni et al. |
| 10,400,837 | B2 * | 9/2019 | Philpott ............ F16D 65/0068 |
| 2010/0038190 | A1 * | 2/2010 | Renz ................ F16D 65/0068 188/72.4 |
| 2014/0151165 | A1 * | 6/2014 | Zenzen .............. B23P 15/18 188/73.31 |
| 2014/0345983 | A1 | 11/2014 | Baumgartner et al. |
| 2015/0192181 | A1 | 7/2015 | Asen et al. |

FOREIGN PATENT DOCUMENTS

| | | | | |
|---|---|---|---|---|
| CN | 105874232 A | | 8/2016 | |
| DE | 10 2013 110 159 A1 | | 3/2014 | |
| DE | 10 2013 016 312 A1 | | 4/2015 | |
| DE | 10 2014 101 083 A1 | | 7/2015 | |
| EP | 0140511 A1 * | | 5/1985 | ............... B22C 9/18 |
| EP | 2 895 763 B1 | | 5/2018 | |
| EP | 2 902 653 B1 | | 5/2018 | |
| JP | 62240136 A * | | 10/1987 | |

OTHER PUBLICATIONS

International Preliminary Report on Patentability (PCT/IB/326 & PCT/IB/373) issued in PCT Application No. PCT/EP2017/069471 dated Feb. 21, 2019, including English translation of document C2 (German-language Written Opinion (PCT/ISA/237) previously filed on Feb. 8, 2019 (seven pages).

International Search Report (PCT/ISA/210) issued in PCT Application No. PCT/EP2017/069471 dated Oct. 20, 2017 with English translation (six pages).

German-language Written Opinion (PCT/ISA/237) issued in PCT Application No. PCT/EP2017/069471 dated Oct. 20, 2017 (four pages).

German-language Office Action issued in counterpart German Application No. 10 2016 114 826.1 dated May 31, 2017 (six pages).

* cited by examiner

BRAKE CARRIER

CROSS REFERENCE TO RELATED APPLICATIONS

This application is a continuation of PCT International Application No. PCT/EP2017/069471, filed Aug. 1, 2017, which claims priority under 35 U.S.C. § 119 from German Patent Application No. 10 2016 114 826.1, filed Aug. 10, 2016, the entire disclosures of which are herein expressly incorporated by reference.

BACKGROUND AND SUMMARY OF THE INVENTION

The present invention relates to a brake carrier for a disc brake. The invention also relates to a disc brake, to a casting mold, and to a method for producing a brake carrier.

In the activation of a disc brake having a brake caliper that is configured as a sliding caliper, the brake force is transmitted to brake pads and, on account thereof, to a brake disc by way of a clamping mechanism that is integrated in the brake caliper of the disc brake. In this procedure, a brake pad on the clamping mechanism is moved in the direction of the brake disc. As soon as the brake pad on the clamping mechanism is in contact with the brake disc, the brake caliper conjointly with a brake pad on the back of the caliper, on account of the counterforce being created, is pushed in the direction of the brake disc.

A braking action is generated as soon as the brake pad on the back of the caliper also contacts the brake disc. Additionally, in order to ensure a constant air gap, the clamping mechanism is extended further as wear increases. The clamping force required is generated by a brake lever, which in the case of disc brakes according to the prior art is in many instances activated by a compressed-air cylinder.

The brake caliper is mounted so as to be displaceable on the locationally fixed brake carrier which is fixedly fastened to an axle flange. The brake carrier guides the brake pads in each case in a pad slot and absorbs circumferential forces created when braking. The brake carrier, by way of a wrap-around disc holder of the brake carrier, surrounds part of the brake disc. A void between the brake disc and the wrap-around disc holder of the brake carrier must have a relatively minor spacing from the brake carrier so as to guarantee that the brake pads are reliably supported or guided, respectively.

Generic brake carriers for disc brakes such as described, for example, in DE 10 2013 110 159 A1, are integrally produced, preferably by primary forming methods, preferably in sand-casting methods, wherein cast iron with spheroidal graphite or spheroidal graphite iron, respectively, is used as a material. For reasons related to the production process, cast brake carriers have a mold partition burr.

This mold partition burr in the case of cast brake carriers according to the prior art lies in the region of the void between the brake disc and the wrap-around disc holder, or in the region of a so-called brake disc slot, respectively.

Since said mold partition burr interferes at this location, the mold partition burr has to be removed in the context of a cleaning process or in the context of subtractive final machining of the brake carrier. Since the accessibility of the mold partition burr on the internal side of the wrap-around disc holder is hampered, the removal of the mold partition burr is accordingly complex and thus cost-intensive.

To this extent, integral brake carriers of this type have in principle been successful but do offer further potential for optimization. A brake carrier in which the mold partition burr is at least in regions configured in lateral depressions in the region of the wrap-around disc holder is known from DE 10 2014 101 083 A1. In the case of this solution a certain weakening of the cross section of the wrap-around disc holder on account of the depressions, in particular in the region of the so-called hub arch, is disadvantageous.

The invention is therefore based on the object of achieving a brake carrier that is further optimized in terms of the mold partition burr.

The invention achieves said object by way of a brake carrier for a disc brake having at least one brake pad, wherein the brake carrier has the following: a wrap-around disc holder which in a frame-like manner encompasses a portion of a brake disc of the disc brake to be assigned; and at least one brake pad slot in which the brake carrier guides the at least one brake pad. The at least one brake pad slot is formed by carrier lugs, support faces, and bridge struts on the wrap-around disc holder. The brake carrier is integrally produced by a primary forming method and has a mold partition burr. The mold partition burr is disposed outside the wrap-around disc holder.

The invention furthermore achieves said object by a casting mold for producing the brake carrier and by a method for providing the brake carrier.

Accordingly, a substantial difference in relation to the prior art lies in that the mold partition face and the mold partition burr are disposed outside the wrap-around disc holder.

On account thereof, the mold partition burr is advantageously repositioned to a non-critical location of the brake carrier and therefore is advantageously removable in a simple and thus cost-effective manner.

In one preferred embodiment of the invention, the mold partition face and the mold partition burr are disposed above the carrier lugs.

On account thereof, the mold partition burr is advantageously disposed on a non-critical location, specifically in each case on the free end of the carrier lugs, of the brake carrier, and therefore is advantageously removable in a simple and thus cost-effective manner in as far as the latter is required.

It is moreover advantageous that the carrier lugs have dissimilar heights, in particular that the two carrier lugs on a side of the brake carrier that faces the fastening flange have in each case a greater height than the two carrier lugs on the side of the brake carrier that faces away from the fastening flange.

On account thereof, a compact, installation-space-saving geometry for the carrier lugs on the side of the brake carrier that faces away from the fastening flange is advantageously chosen.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
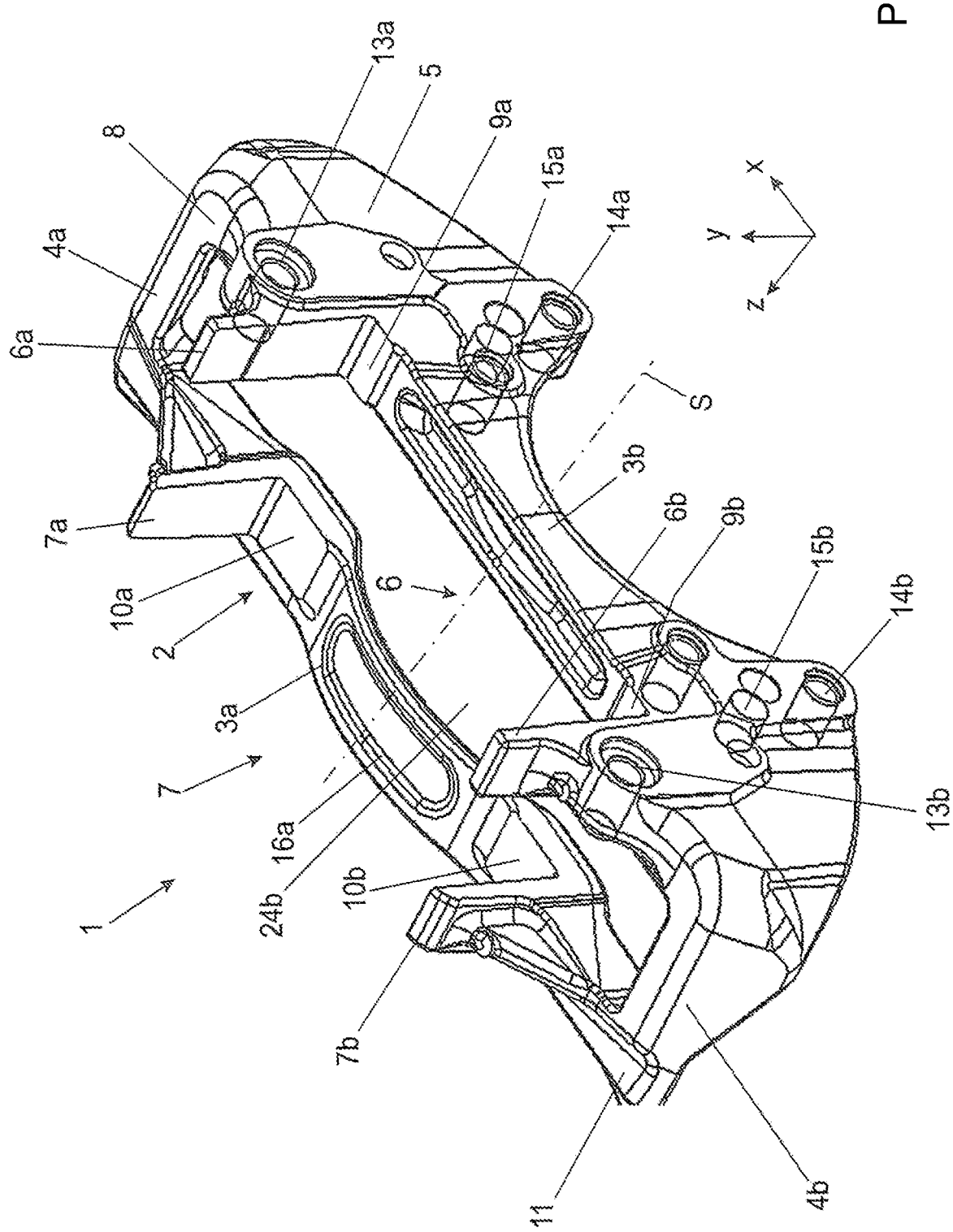
FIG. 1 shows a three-dimensional/isometric illustration of the brake carrier according to the prior art.
Figure 1A:
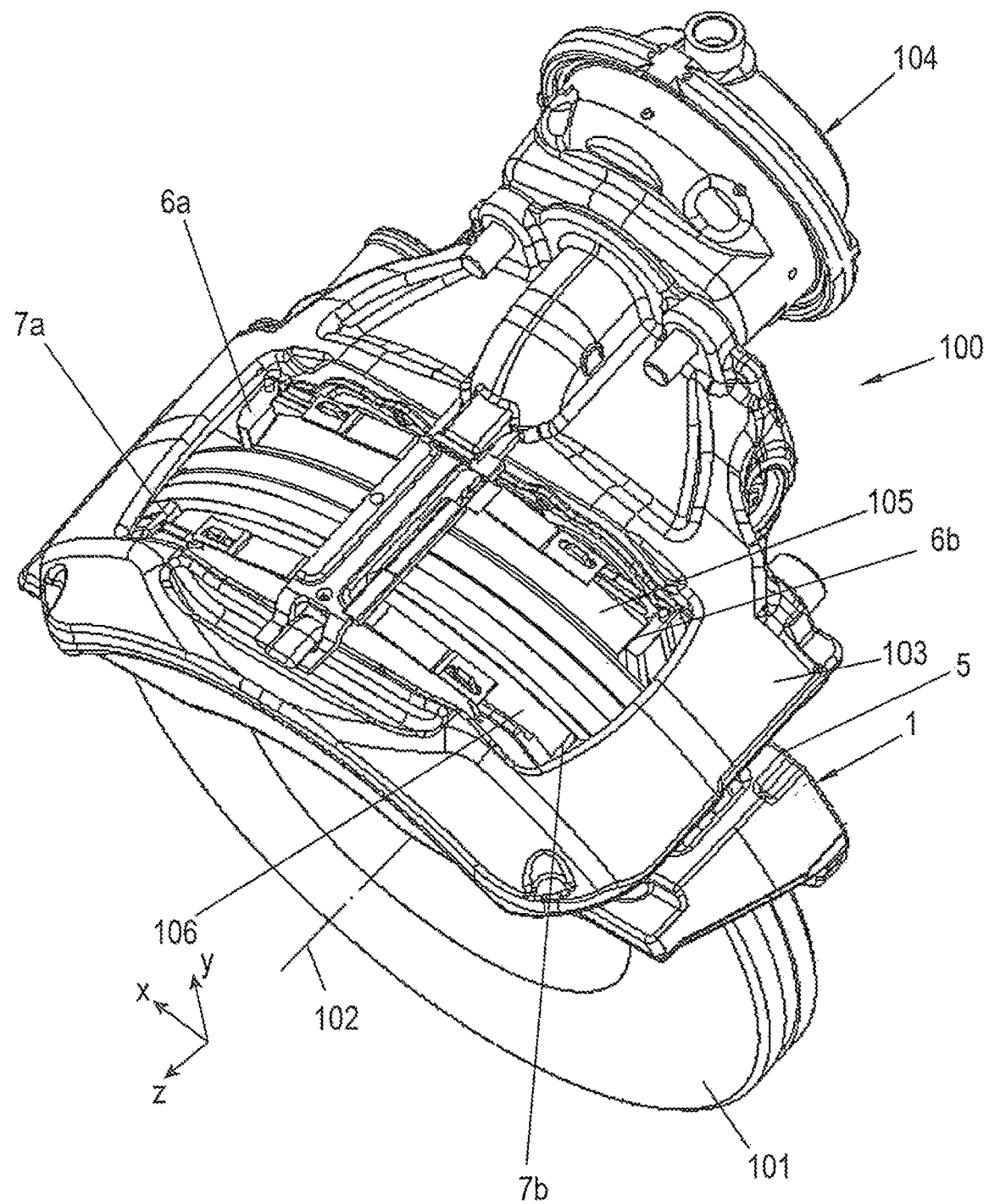
FIG. 1A shows a schematic perspective illustration of a disc brake according to an embodiment of the invention.

FIG. 1 represents a three-dimensional/isometric illustration of a brake carrier 1 according to the prior art. FIG. 1A shows a schematic perspective illustration of a disc brake 100 according to an embodiment of the invention.

Coordinates x, y, z serve for orientation, wherein the x-direction runs in a longitudinal direction of a vehicle (not shown) to which the disc brake 100 is assigned. The y-direction indicates a height direction, wherein the z-direction indicates a width or transverse direction of the imaginary vehicle.

The disc brake 100 here comprises the brake carrier 1, a brake disc 101 having a brake disc rotation axis 102, a brake caliper 103 embodied as a sliding caliper, a brake cylinder 104 for activating the disc brake 100, a brake pad 105 on the clamping mechanism, and a brake pad 106 on the back of the caliper.

A brake carrier 1 of a disc brake 100 which corresponds to a brake carrier 1 according to the prior art is illustrated in FIG. 1. The brake carrier 1 is preferably configured so as to be integral. Said brake carrier 1 is preferably produced by a primary forming method, particularly preferably by casting, wherein a ductile cast iron variety, particularly preferably cast iron with spheroidal graphite, is preferably used.

The brake carrier 1 as a wrap-around disc holder 2, or as a disc frame, in the manner of a frame spans or encompasses, respectively, a portion of the brake disc 101 of the disc brake 100 that is connected in a rotationally fixed manner to a vehicle axle. The brake disc 101 is rotatable about the brake disc rotation axis 102 thereof which runs in the z-direction. The brake carrier 1, so as to be parallel to the brake disc 101 or spaced apart from the latter in the axial direction, on both sides of said brake disc 101, has in each case one bridge strut 3a, 3b. The bridge struts 3a, 3b have a substantially rectilinear shape which in the region of the axle recess, or of the hub recess, respectively, spans the latter in an arcuate manner. The bridge struts 3a, 3b are thus colloquially in each case also referred to as an arcuate hub arch 3a, 3b. The two bridge struts 3a, 3b, in a manner parallel to the brake disc rotation axis 102, or in the radial direction in relation to the brake disc spaced apart by way of frame portions 4a, 4b, respectively, are connected to one another so as to form the wrap-around disc holder 2. The wrap-around disc holder 2 in this way encompasses a brake disc slot 24.

One of the bridge struts 3b lies on the side on which the brake carrier 1 has a fastening flange 5 which can be fastened to an axle flange (not illustrated here). The axle flange is in each case disposed on the one end of a vehicle axle. The fastening flange 5 of the brake carrier 1 is accordingly stabilized on the vehicle axle. The brake carrier 1 furthermore has two carrier lugs (also called horns) 6a, 6b, and 7a, 7b, respectively, on each side of the brake disc 101. There are therefore in total four of the carrier lugs 6a, 6b, and 7a, 7b. Said carrier lugs 6a, 6b, 7a, 7b are configured so as to be integral to the wrap-around disc holder 2. Said carrier lugs 6a, 6b, 7a, 7b, proceeding from an area or plane 8, respectively (by definition hereunder referred to as the base area 8), extend upward from the frame portions 4a, 4b.

The carrier lugs 6a, 6b, as well as 7a, 7b, in terms of the coordinate system in FIG. 1, thus extend in the direction of positive y-values. Said carrier lugs 6a, 6b, as well as 7a, 7b here are preferably disposed so as to be symmetrical to in each case one of the hub arches 3a, 3b. Said carrier lugs 6a, 7b, as well as 7a, 7b in a plane parallel to the friction face of the brake disc furthermore preferably lie behind one another in the circumferential direction, or in a plane parallel to the x-y plane in terms of the coordinate system in FIG. 1. Said carrier lugs 6a, 6b, as well as 7a, 7b form in each case one brake pad slot 6, 7 as a respective support and guide of the brake pads 105, 106.

The two carrier lugs 6a, 6b on the side of the brake carrier 1 that faces the fastening flange have in each case an L-shaped cross section. Moreover, the two carrier lugs 7a, 7b on the side of the brake carrier 1 that faces away from the fastening flange preferably also have in each case an L-shaped cross section. The letter "L" is in each case aligned in the direction of the brake pads 105, 106, so as to configure support locations for said brake pads 105, 106 in the radial direction and in the circumferential direction.

The carrier lugs 6a, 6b, and 7a, 7b, respectively, conjointly with lower support locations 9a, 9b, and 10a, 10b and the bridge struts 3a, 3b of the brake carrier 1, configure in each case one of the two brake pad slots 6, 7 on the wrap-around disc holder 2, said brake pad slots 6, 7 in each case guiding or supporting, respectively, one pad support plate of the associated brake pad 105, 106, in the circumferential direction, that is to say on the run-in and the run-out side, as well as in a downward manner.

One or preferably both of the frame portions 4a, 4b, in each case proceeding from a respective end of a reinforcement rib 11, widens in each case up to an external periphery 12 of the side of the brake carrier 1 that faces the fastening flange, or in each case proceeding from a respective end of the reinforcement rib 11, widens in each case in a manner parallel to the vehicle wheel axle/brake disc rotation axis 102 in a positive z-direction in terms of the coordinate system of FIG. 1, respectively.

The support locations 9a, 9b, and 10a, 10b, respectively, in the y-direction in terms of the coordinate system in FIG. 1, support in each case the brake pad 105, 106 on the brake carrier 1, wherein the support locations 9a, 9b, and 10a, 10b, respectively, simultaneously define the spacing of the respective brake pad 105, 106 in relation to the vehicle axle.

Bearing bolts for the brake caliper 103 embodied as a sliding caliper are capable of being fastened to fastening locations 13a, 13b. This is known per se to a person skilled in the art and is therefore not described in more detail here.

The brake carrier 1 is preferably a component that is symmetrical in relation to a symmetry plane "S" (cf. FIG. 1) which is defined between the y-axis and the z-axis of the coordinate system in FIG. 1, or is parallel to said symmetry plane "S". For reinforcement, said brake carrier 1 on its external side that faces away from the fastening flange has a reinforcement rib 11. The reinforcement rib 11 extends so as to be parallel to a friction face of the brake disc 101.

The reinforcement rib 11 has a contoured geometry that is continuous across the entire face of the external side of the brake carrier 1 that faces away from the fastening flange. The contoured geometry of the reinforcement rib 11 begins in each case at two ends on the frame portion 4a, 4b of the brake carrier 1 and, proceeding therefrom, runs in each case initially parallel below a plane or in the plane of the console-type base area 8 of the wrap-around disc holder 2 in the direction of numerically lower or higher x-values in terms of the coordinate system in FIG. 1 toward the inside, or towards the center, respectively. The contour profile of the reinforcement rib 11 toward the center then follows in each case the arcuate hub arch of the bridge strut 3b on the external side thereof (that is to say on the external side thereof that faces away from the brake disc 101) up to the symmetry plane "S". The reinforcement rib 11 is configured so as to be mirror-symmetrical in relation to the symmetry plane "S". The reinforcement rib 11 reinforces the side of the brake carrier 1 that faces away from the fastening flange.

The fastening flange 5 has fastening locations 14a, 14b, as well as 15a, 15b. The reinforcement rib 11 is positioned in such a manner that said reinforcement rib 11 is disposed above the fastening locations 14a, 14b, and 15a, 15b, respectively, of the brake carrier 1. On account thereof, said reinforcement rib 11 in the region of the carrier lugs 7a, 7b is disposed only just below the plane or in the plane of the base area 8 of the wrap-around disc holder 2. A short introduction of force and torque into the reinforcement rib 11 is achieved on account of this arrangement, such that a reinforcement of the side of the brake carrier 1 that faces away from the fastening flange is achieved by way of the reinforcement rib 11.

On account of a correspondingly dimensioned thickness of the reinforcement rib 11, and while utilizing the maximum available installation space, much material of the brake carrier 1 in a plane parallel to the x-z plane in terms of the coordinate system in FIG. 1 is moved outward to a position as far away as possible from the wrap-around disc holder 2. On account thereof, the geometrical moment of inertia, or the geometrical moment of the second order, respectively, in terms of a deformation axis which lies so as to be parallel to the y-axis of the coordinate system in FIG. 1, this moment being particularly relevant to a deformation under operating stress, is conceived so as to be of a corresponding size. This enables a reduction of wall thicknesses in the region of the wrap-around disc holder 2.

In this context, the two bridge struts 3a, 3b have in each case pockets 16a, 16b by way of which the thickness, or the wall thickness, respectively, of the respective bridge strut 3a, 3b of the brake carrier 1 is reduced at these locations. Material and thus weight is saved on account of the reduction in the wall thickness in the region of the pockets 16a, 16b.

The term "pocket" refers to a planar recess within a geometric element of a component, said planar recess, as opposed to a groove, being delimited by one or a plurality of walls and one base. The thickness of the respective geometric element in the region of the pocket 16a, 16b is reduced on account of the pocket 16a, 16b.

Figure 2:
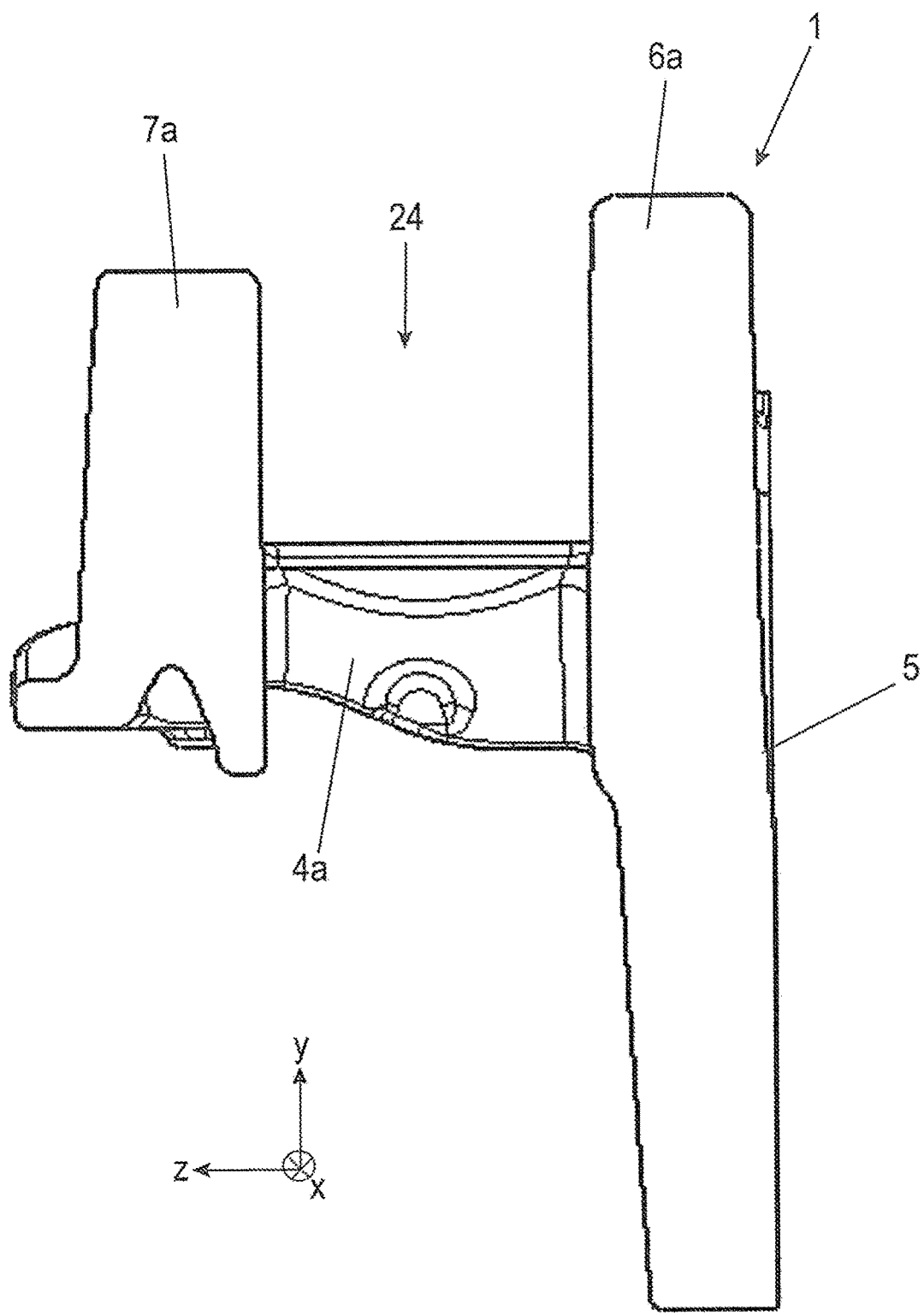
FIG. 2 shows a sectional side view of the brake carrier from FIG. 1.

FIG. 2 shows a sectional side view of the brake carrier 1 from FIG. 1 in a z-y plane.

It is clearly illustrated in FIG. 2 that the carrier lugs 6a, 6b here, as compared to the carrier lugs 7a, 7b, have dissimilar heights, or dissimilar extents, respectively, in the positive y-direction in terms of the coordinate system in FIG. 1. The two carrier lugs 6a, 6b on the side of the brake carrier 1 that faces the fastening flange herein have in each case a greater height than the two carrier lugs 7a, 7b on the side of the brake carrier 1 that faces away from the fastening flange. A compact, installation-space-saving geometry for the carrier lugs 7a, 7b on the side of the brake carrier 1 that faces away from the fastening flange is chosen on account thereof.

Figure 3:
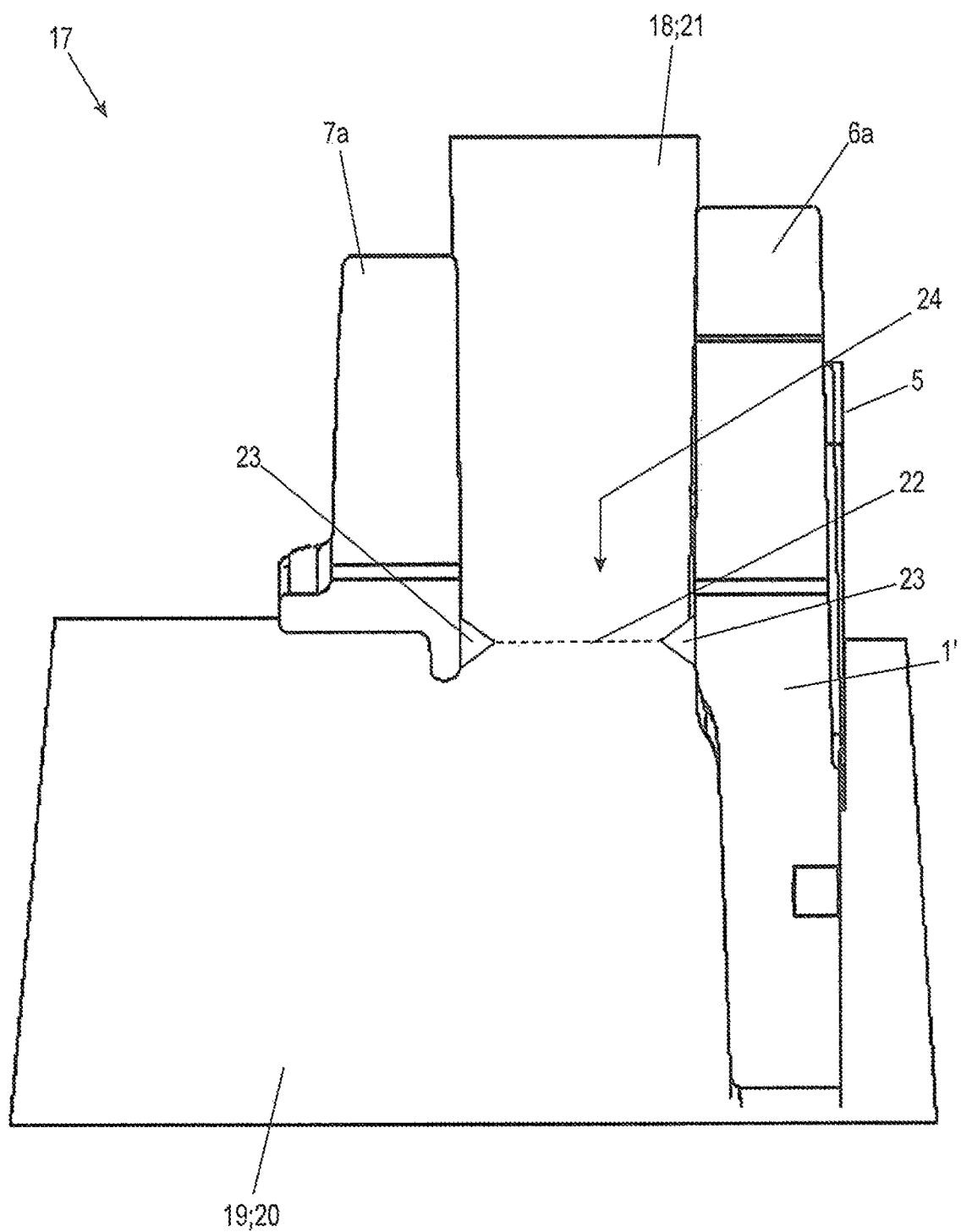
FIG. 3 shows a fragment of a sectional side view of a casting mold of a brake carrier according to the prior art.

A fragment of a sectional side view of a casting mold 17 of the brake carrier 1 according to the prior art is illustrated in FIG. 3. The brake carrier 1 is preferably molded in a mechanized manner in a casting method having a permanent pattern 1' and the lost casting mold 17, the latter here and preferably being embodied as a sand mold.

The casting pattern 1' of the brake carrier 1 has the dimensions of the brake carrier 1 and additionally a factor that in the trade is referred to as the "material shrinkage". The factor takes into account the volumetric reduction of the cast brake carrier 1 when cooling, in particular when transitioning from a liquid to a solid state. The casting pattern 1' moreover has demolding ramps on account of which the casting pattern 1' after molding is removable from the casting mold without damaging the casting mold. The angle of the demolding ramps depends on the length of a geometric element to be demolded. The greater the length of the geometric element to be demolded, the smaller the chosen angle of the demolding ramp.

The casting mold 17 here comprises an upper mold half 18 and a lower mold half 19 and here is thus in an exemplary manner embodied as a box mold. Alternatively, the casting mold 17 can also be embodied as a boxless mold having a vertical mold separation. In the latter case, the casting pattern 1' in relation to FIG. 2 or FIG. 3, respectively, is incorporated in the mold so as to be rotated by 90°, such that a vertical mold separation results.

The brake carrier 1 is advantageously incorporated in the mold without a core. The brake disc slot 24 that is delimited by the wrap-around disc holder 2 is molded by way of a so-called upstanding mold face 20 and a so-called suspended mold face 21. The upstanding mold face 20 is part of the lower mold half 19, while the suspended mold face 21 is part of the upper mold half 18. In the case of a vertical mold partition, right and left mold faces do indeed result accordingly, however the latter can also be understood to be suspended or upstanding mold faces, respectively, which are in each case rotated by 90°. Both mold faces 20, 21 abut in a mold partition face 22 and thus shape the brake disc slot 24.

For reasons related to the method, a mold partition burr 23 is configured on the cast brake carrier 1 at the respective peripheries of the mold partition face 22. The mold partition burr 23, which the upstanding mold face 20 and the suspended mold face 21 for reasons related to the method generate on the brake carrier 1, in the case of the brake carrier 1 according to the prior art in FIG. 1, FIG. 2, as well as FIG. 3, protrudes into the brake disc slot 24.

Since the extent of the of the brake disc slot 24 in the radial direction of the brake disc 101, by virtue of the available installation space of the brake carrier 1, is delimited in the radial direction of the brake disc 101 and therefore is also provided with correspondingly tight tolerances, the mold separation burr 23 in the region of the brake disc slot 24, or in the region of the wrap-around disc holder 2, respectively, has to be removed by a mechanical separation method. This leads to additional complexity and thus to additional costs. The removal of the mold partition burr 23 is additionally hampered by the difficult and thus compromised accessibility on the internal side of the wrap-around disc holder 2 in the region of the brake disc slot 24.

Figure 4:
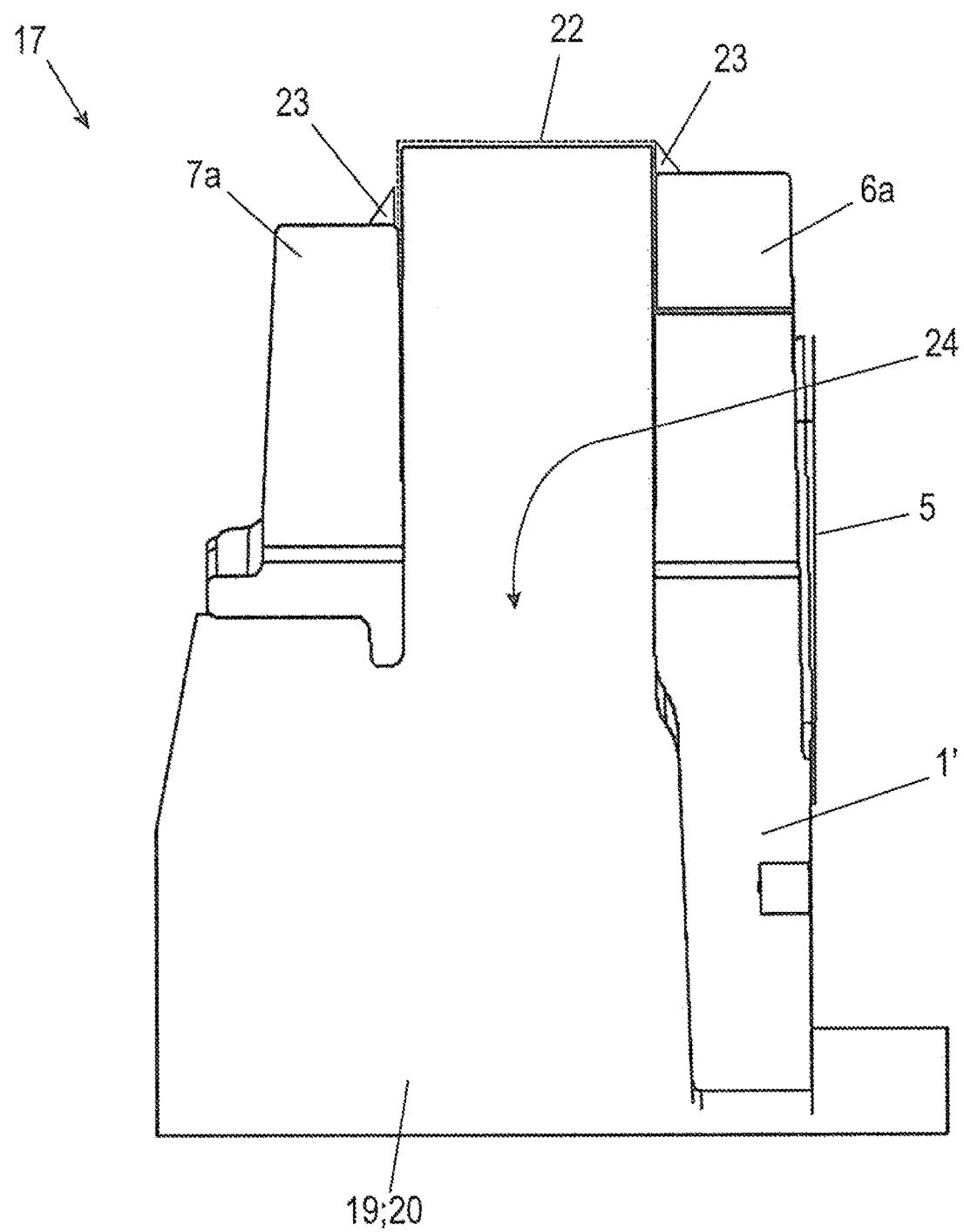
FIG. 4 shows a fragment of a sectional side view of a casting mold of a brake carrier according to an embodiment of the invention.

A fragment of a sectional side view of a casting mold 17 of the brake carrier 1 according to an embodiment of the invention is illustrated in FIG. 4.

Only deviations from or additions to the casting mold 17 according to FIG. 3 will be described hereunder in order for repetitions to be avoided.

Deviating from the illustration in FIG. 3, the casting form 17 according to FIG. 4 has a mold partition face 23 which is disposed outside the wrap-around disc holder 2, or outside the brake disc slot 24, respectively, of the brake carrier 1.

The mold partition face 22 in the exemplary embodiment according to FIG. 3 is in each case disposed above the carrier lugs 6a, 6b, as well as 7a, 7b of the casting pattern 1' incorporated in the mold, thus so as to be disposed in the positive y-direction in terms of the coordinate system in FIG. 3.

On account thereof, the mold partition burr 23 is advantageously disposed on a non-critical location of the brake carrier 1, specifically on the respective free ends of the carrier lugs 6a, 6b as well as 7a, 7b. The mold partition burr 23 therefore is advantageously removable in a simple and thus cost-effective manner, in as far as this is required. The upstanding mold space 20 required therefore according to the exemplary embodiment of FIG. 3 is comparatively long and protrudes beyond the carrier lugs 6a, 6b, as well as 7a, 7b of the casting pattern 1' incorporated in the mold. On account of the length of the upstanding mold space 20, the required angle of the demolding ramp is advantageously embodied so as to be smaller than in a brake carrier 1 according to the prior art in FIG. 2. On account thereof, the material is advantageously saved.

The capability of the relatively long upstanding mold space 20 according to FIG. 4 to be produced in a process-reliable manner, is provided by way of the production of the mold halves 18, 19 according to FIG. 3 by way of usual casting mold presses and an optionally increased content of binder in the foundry sand. The stability of the upstanding face according to FIG. 4 can optionally be further improved by a shell mold method or the use of a special shell mold sand, in as far as this is required.

Figure 5:
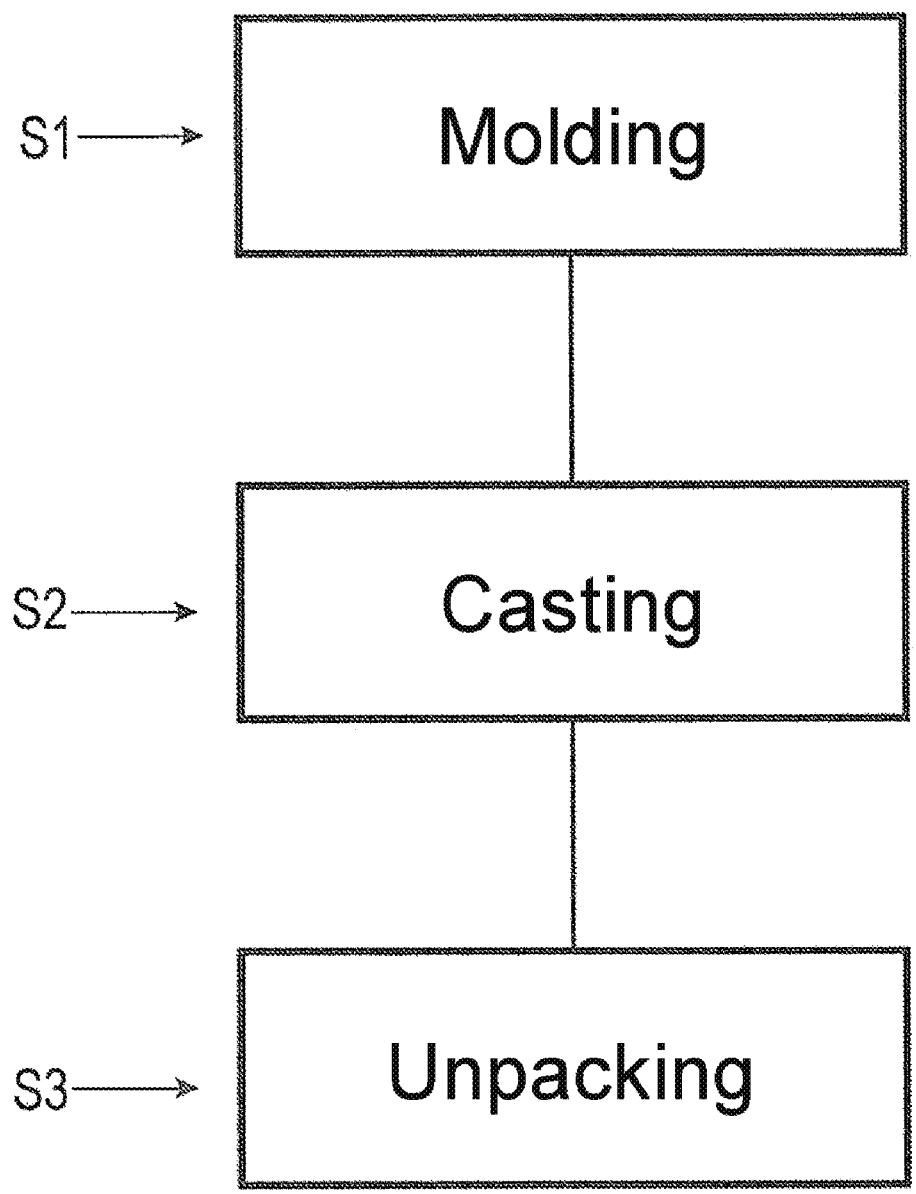
FIG. 5 shows a schematic flow diagram of an exemplary embodiment of a method according to the invention.

The following method which in FIG. 5 is shown as a schematic flow diagram of an exemplary embodiment of the method according to the invention is specified for producing the brake carrier 1.

In a first method step S1 "molding", a casting pattern 1' of the brake carrier 1 is first provided.

In a subsequent method sub-step, an upper mold half 18 is molded in a molding material while using the casting pattern 1', wherein the upper mold half 18 has a suspended mold face 21 for molding a brake disc slot 24 of the brake carrier 1.

In a further method sub-step, the molded casting model 1' is removed from the upper mold half 18.

In a subsequent method sub-step, a lower mold half 19 is molded in a molding material while using the casting pattern 1', wherein the lower mold half 19 has an upstanding face 20 for molding the brake disc slot 24 of the brake carrier 1.

In a further method sub-step, the molded casting pattern 1' is removed from the lower mold half 19.

In a subsequent method sub-step, the lower mold half 19 and the upper mold half 18 are assembled so as to form the casting mold 17, wherein the upstanding mold face 20 and the suspended mold face 21 mutually abut on a mold partition face 22 which is disposed above the carrier lugs 6a, 6b, 7a, 7b of the casting pattern 1' incorporated in the mold.

In a second method step S2 "casting", a liquid material is poured into the casting mold 17.

In a subsequent third method step S3 "unpacking", the cooled brake carrier 1 is unpacked from the casting mold 17 by destroying the casting mold 17.

In a further method sub-step, cleaning of the completely cast brake carrier 1 is carried out, wherein the mold partition burr 23 on the brake carrier 1 is also optionally removed.

In a further method sub-step, the brake carrier 1 is finally mechanically processed.

LIST OF REFERENCE SIGNS

1 Brake carrier
1' Casting pattern
2 Wrap-around disc holder
3a, 3b Bridge strut
4a, 4b Frame portion
5 Fastening flange
6, 7 Brake pad slot
6a, 6b Carrier lug
7a, 7b Carrier lug
8 Base area
9a, 9b Support face
10a, 10b Support face
11 Reinforcement rib
12 External periphery
13a, 13b Fastening location
14a, 14b Fastening location
15a, 15b Fastening location
16a, 16b Pocket
17 Casting mold
18 Upper mold half
19 Lower mold half
20 Standing mold face
21 Suspended mold face
22 Mold partition face
23 Mold partition burr
24 Brake disc slot
100 Disc brake
101 Brake disc
102 Brake disc rotation axis
103 Brake caliper
104 Brake cylinder
105, 106 Brake pad
S Symmetry plane The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake carrier for a disc brake having at least one brake pad, comprising:
    a) a wrap-around disc holder which encompasses a portion of a brake disc of the disc brake to be assigned;
    b) at least one brake pad slot in which the brake carrier guides the at least one brake pad;
    c) wherein the at least one brake pad slot is formed by carrier lugs, support faces, and bridge struts on the wrap-around disc holder; and
    d) the brake carrier is integrally produced by a primary forming method and has a mold partition burr,
    wherein
    e) the mold partition burr is disposed outside the wrap-around disc holder, and
    f) the mold partition burr is in each case disposed on a free end of the carrier lugs.

2. The brake carrier as claimed in claim 1, wherein the brake carrier has a fastening flange.

3. The brake carrier as claimed in claim 2, wherein the brake carrier has a reinforcement rib which is disposed on an external side of the brake carrier that faces away from the fastening flange.

4. The brake carrier as claimed in claim 3, wherein the reinforcement rib has a continuous contour geometry.

5. The brake carrier as claimed in claim 3, wherein the wrap-around disc holder has frame portions.

6. The brake carrier as claimed in claim 5, wherein
one or both of the frame portions, in each case proceeding from a respective end of the reinforcement rib, widens in each case up to an external periphery of the side of brake carrier that faces the fastening flange.

7. The brake carrier as claimed in claim 1, wherein
one set of carrier lugs has a height that is dissimilar to that of another set of carrier lugs.

8. The brake carrier as claimed in claim 7, wherein
the set of carrier lugs on the side of the brake carrier that faces the fastening flange have in each case a greater height than the set of carrier lugs on the side of the brake carrier that faces away from the fastening flange.

9. The brake carrier as claimed in claim 1, wherein
the brake carrier is produced by a casting method.

10. The brake carrier as claimed in claim 9, wherein
the brake carrier is produced in a casting method having a permanent casting pattern and a lost casting mold.

11. A disc brake comprising a brake carrier as claimed in claim 1.

12. A casting mold, comprising:
two mold halves for producing a brake carrier as claimed in claim 1, wherein
one mold half has an upstanding mold face,
the other mold half has a suspended mold face,
the two mold faces shape a brake disc slot of the brake carrier, and
the upstanding mold face and the suspended mold face abut at a mold partition face, wherein the mold partition face is in each case disposed above the carrier lugs of a casting pattern incorporated in the mold of the brake carrier.

13. A method for producing a brake carrier, the method comprising the steps of:
a) providing a casting pattern of the brake carrier;
b) molding an upper mold half in a mold material while using the casting pattern, wherein the upper mold half has a suspended mold face for molding a brake disc slot of the brake carrier;
c) removing the molded casting pattern from the upper mold half;
d) molding a lower mold half in a mold material while using the casting pattern, wherein the lower mold half has an upstanding face for molding the brake disc slot of the brake carrier;
e) removing the molded casting pattern from the lower mold half;
f) assembling the lower mold half and the upper mold half so as to form a casting mold, wherein the upstanding mold face and the suspended mold face mutually abut at a mold partition face which is disposed above carrier lugs of the casting model incorporated in the mold;
g) pouring a liquid material into the casting mold;
h) unpacking the brake carrier after cooling from the casting mold by destroying the casting mold;
j) cleaning the brake carrier; and
k) machining the brake carrier,
wherein after the pouring step, the brake carrier has a mold partition burr disposed on a free end of the carrier lugs.

14. The method as claimed in claim 13, wherein method step j) includes removal of a mold partition burr.

* * * * *